Jan. 11, 1966 R. WALKER 3,228,697

RECORD PLAYERS

Filed April 3, 1963 4 Sheets-Sheet 1

INVENTOR

RONALD WALKER

By Kurt Kelman

AGENT

INVENTOR
RONALD WALKER
BY Kurt Kelman
AGENT

Jan. 11, 1966 R. WALKER 3,228,697

RECORD PLAYERS

Filed April 3, 1963 4 Sheets-Sheet 3

INVENTOR.
RONALD WALKER
BY Kurt Kelman
AGENT

INVENTOR
RONALD WALKER
by Kurt Kelman
AGENT

United States Patent Office 3,228,697
Patented Jan. 11, 1966

3,228,697

RECORD PLAYERS

Ronald Walker, Norton, Stourbridge, England, assignor to BSR Limited, Old Hill, England, a British company Filed Apr. 3, 1963, Ser. No. 270,314
Claims priority, application Great Britain, Apr. 24, 1962, 15,466/62
5 Claims. (Cl. 274—9)

This invention relates to record players of the kind comprising a motor driven turntable support for a disc-type record and an angularly movable pick-up arm which is pivotal about an axis displaced from and parallel to the turntable axis and is adapted to carry at or towards its outer end a needle, stylus or the like, generally referred to as the pick-up, for engagement with the record track in the form of a spiral groove on the upper face of the record. The invention is particularly concerned with mechanism provided for semi-automatically starting the rotation of the table and for automatically interrupting the power drive to the table when the pick-up has reached the end of the record track. Such mechanism commonly comprises a spring biased toggle linkage which on one side of its dead centre position urges a switch and/or clutch or other driving member into the "on" or operative position and on the other side into the "off" or inoperative position. A displaceable lever or system of levers is adapted to be engaged by the pick-up arm when this is turned away from the turntable axis to force the toggle linkage from the "off" position through its dead centre and so cause it to snap into its "on" position. There is also provision for the same or another lever or system of levers to be moved by the pick-up arm as this traverses the inner parts of the track to bring a projection on the lever or one of the levers into the path of a radial cam on the turntable spindle. Until the pick-up reaches the end of the record track the rate of movement of the projection is so slow, and the projection and cam are so formed, that the latter merely radially displaces the projection, and thereby the lever by which it is carried, on each rotation of the turntable, the lever being associated with a friction controlled lost motion arrangement to permit such displacement. At the end of the record track the pitch of the spiral groove is sharply increased so that the rate of the angular movement of the pick-up is accelerated and the aforementioned projection is quickly moved into a position in which it will be positively engaged by the cam. This effects positive movement of the lever carrying the projection and this movement is transmitted to the spring biased toggle mechanism to return that mechanism into the off position.

The object of this invention is to provide an improved means of the above indicated type for starting the rotation of the turntable and for subsequently interrupting the power drive thereto.

In accordance with the main feature of the invention the aforementioned projection is provided on a longitudinally displaceable arm which extends from an inner position near the turntable spindle to an outer position in the region of the pick-up arm spindle, at an intermediate position along its length the arm is pivotally coupled to a lever of the spring toggle stop/start controller, the pivotal coupling being adapted to provide for that lever to be positively displaced by longitudinal movement of the arm and for limited transverse movement of the arm and the coupling incorporating a frictional connection between the lever and the arm, at or near its inner end the arm is coupled to the base plate of the apparatus by means providing for the longitudinal movement and for limited transverse movement of this end of the arm, at its outer end the arm is adapted to be coupled through the lost motion linkage to the pick-up arm as this turns away from the table and such that the arm will thereby be displaced to urge the controller into the "on" position and also at its outer end the arm is adapted to be posititively engaged by the pick-up arm to turn the arm in the sense to bring the projection into operative association with cam on the turntable spindle, such that the final movement of the arm will bring the projection into a position to be positively engaged by the cam and the arm will thereby be longitudinally displaced to return the controller to the "off" position.

The pivotal coupling between the arm and the lever of the spring toggle controller may comprise a pin or other projection extending from one member into an elongated hole in the other member, the longer dimension of the hole being transversely of the arm and the pin being a close sliding fit in the hole.

The hole is preferably provided in the arm and the pin or other projection on the lever.

Where switching means is provided in the more usual case of an electric motor driven turntable, the pin or other projection may be adapted to engage a switch-operating lever.

The coupling between the inner end of the arm and the base plate may comprise a pin or other projection on one member extending into an elongated aperture in the other member, the longest dimension of the aperture being in the longiutdinal direction of the arm and the projection being smaller than the smaller dimension of the aperture.

The form of one of the longer boundary edges of the aperture may be such that in the last part of its longitudinal movement into the "off" position the inner end of the arm will be positively moved into a position in which it is completely out of the path of the cam.

The last mentioned aperture will preferably be formed in the arm, the projection being a pin fixed to and upstanding from the base of the turntable mounting.

The outer end of the arm may be formed with a contact surface inclined to its length and adapted to be engaged by one end of a two-arm lever of which the other end is adapted to be engaged by the pick-up arm, as this is turned away from the turntable, whereby the arm will first be caused to turn to the limit of its permissible movement and then be displaced longitudinally into the "on" position.

At its outer end also the arm may be formed with a second contact surface adapted to be engaged by the pick-up arm, as this moves towards its innermost position, to cause the arm to turn about its pivotal coupling with the spring toggle lever and thereby move the projection on the inner end of the arm into such a position that it will be engaged by the cam.

The two-arm lever is preferably pivotal about an axis radially inward, with reference to the turntable axis, from the pick-up arm pivot, being adapted at one end to be engaged by a lever arm fixed to the pick-up arm and at the other end to engage the first mentioned contact surface, to convert the turning movement of the lever arm into the operative movement of the main arm into the "on" position.

The lever arm on the pick-up may also be adapted to engage the second contact surface, on the outer end of the main arm, during the last part of the movement of the pick-up inwards across the turntable, to cause the projection to be moved into a position in which it will be engaged by the cam.

The friction device incorporated in the pivotal coupling between the main arm and the lever of the spring toggle mechanism will be such as to provide sufficient friction to cause the arm to turn about this position when a small turning moment is applied to it but to enable the arm to be displaced transversely when an increased turning moment is suddenly applied to it and/or when it is constrained at either end so that it becomes virtually pivotally mounted at that end.

A record player embodying the invention will now be described by way of example and with reference to the accompanying diagrammatic drawings, wherein.

Figure 1:
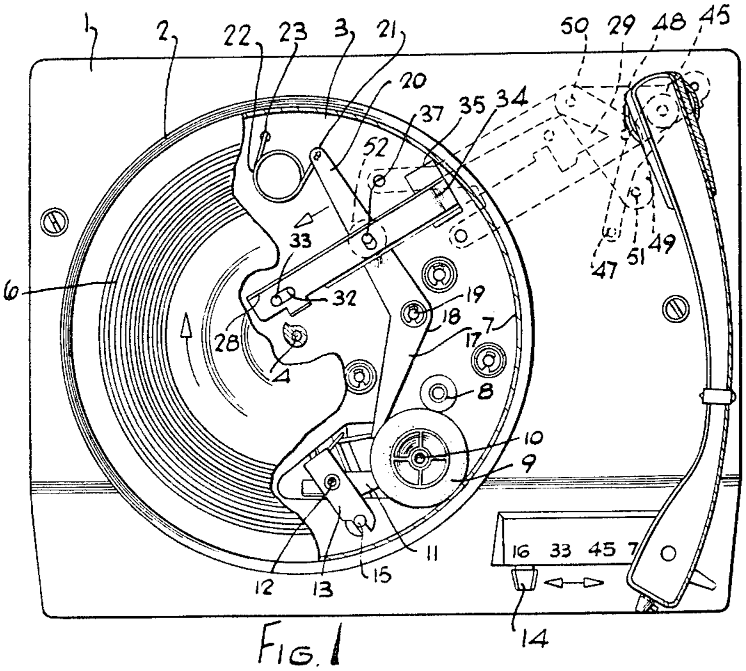
FIGURE 1 represents a plan of the record player with part of the turntable broken away, the mechanism being in the "off" condition.

The record player comprises a substantially flat table 1 formed with a circular recess 2, in the centre of the base 3 of which is located the turntable mounting spindle 4. The turntable 6 is provided on its underside with a hollow spindle 5 which is a running fit on the mounting spindle 4, and on its periphery of the turntable is formed with a downwardly extending cylindrical flange 7. Below the base 3 there is supported an electric motor (not shown) which drives a stepped spindle 8. A jockey pulley 9 is movably mounted so as to mutually engage the stepped spindle 8 and the inside of the flange 7 and thereby transmit the drive from the stepped spindle to the turntable which rotates in the direction of the arrow. The jockey pulley 9 is mounted so as to be freely rotatable about a spindle 10 on a jockey arm 11 which itself is free to move about a pivot 12 on a bracket 13. The bracket 13 is adapted to be raised and lowered by the combination of a spring and stepped cam bar, being controlled by a speed selector 14 movable as indicated by the double headed arrow. By adjusting the height of the bracket 13 and thereby of the jockey pulley 9 the latter can be brought into engagement with the required step on the stepped spindle 8. The bracket 13 is biased by a spring to turn about a pivot 15 to move the jockey pulley 9 into the operative position. As shown in FIGURE 1 the jockey pulley 9 is held out of this position by the end 16 of one arm 17 of a double armed switch lever 18 which is angularly displaceable about a pivot 19 on the base 3.

Beneath the base 3, and not shown in the drawings, there is mounted a motor-controlling switch which is biased into the "off" position and is adapted to be closed by means described below.

The other arm 20 of the switch lever extends at about 120° to the first mentioned arm 17 and at its extreme end 21 is coupled to one end of a toggle spring 22 of which the other end 23 is anchored to the base 3.

Figure 4:
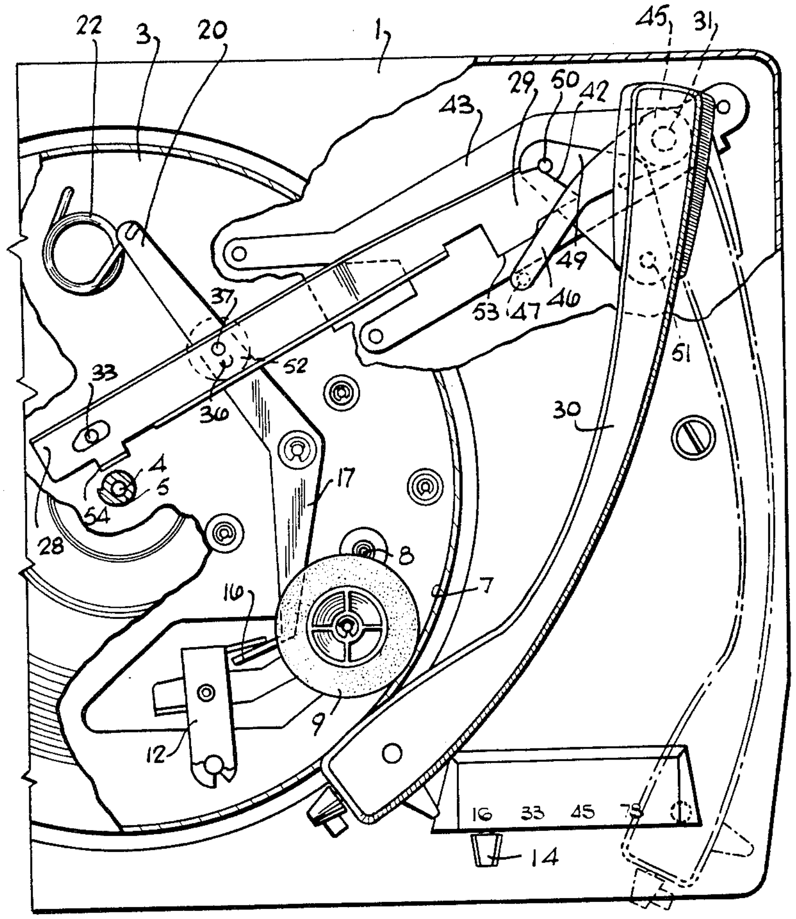
FIGURE 4 is an enlarged view of part of the arrangement of FIGURE 1, with the mechanism having just been moved into the "on" position and with the pick-up arm in position to begin reproduction.

In FIGURE 1 the mechanism is shown in the "off" condition and the arrangement is such that if a force is applied to the arm 20 of the switch lever 18 in the direction of the arrow the spring toggle 22 will be forced over its dead centre and will then snap into the "on" condition; in so doing it will close the motor switch and by turning the end 16 of the other arm 17 away from the bracket 12 will allow this bracket to be turned clockwise by its spring to bring the jockey pulley 9 into the driving position as indicated in FIGURE 4. It will also be apparent that the application thereafter of a force in the opposite direction to the arm 20 will return the mechanism to the "off" condition.

Figure 2:
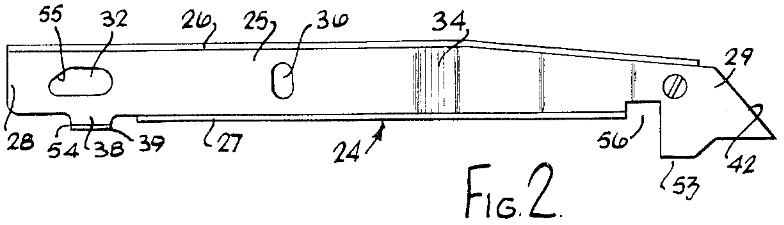
FIGURE 2 is a view in elevation and on a larger scale of the main actuating arm of the mechanism.
Figure 3:
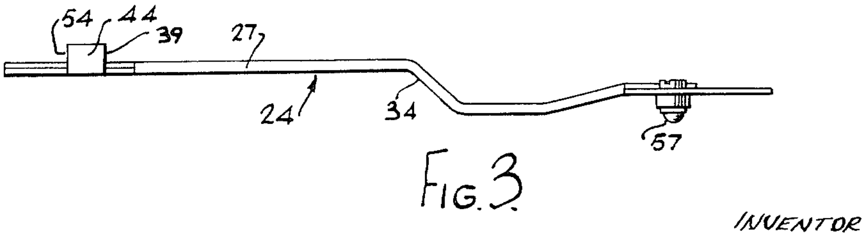
FIGURE 3 is a side view of the arm shown in FIGURE 2.
Figure 6:
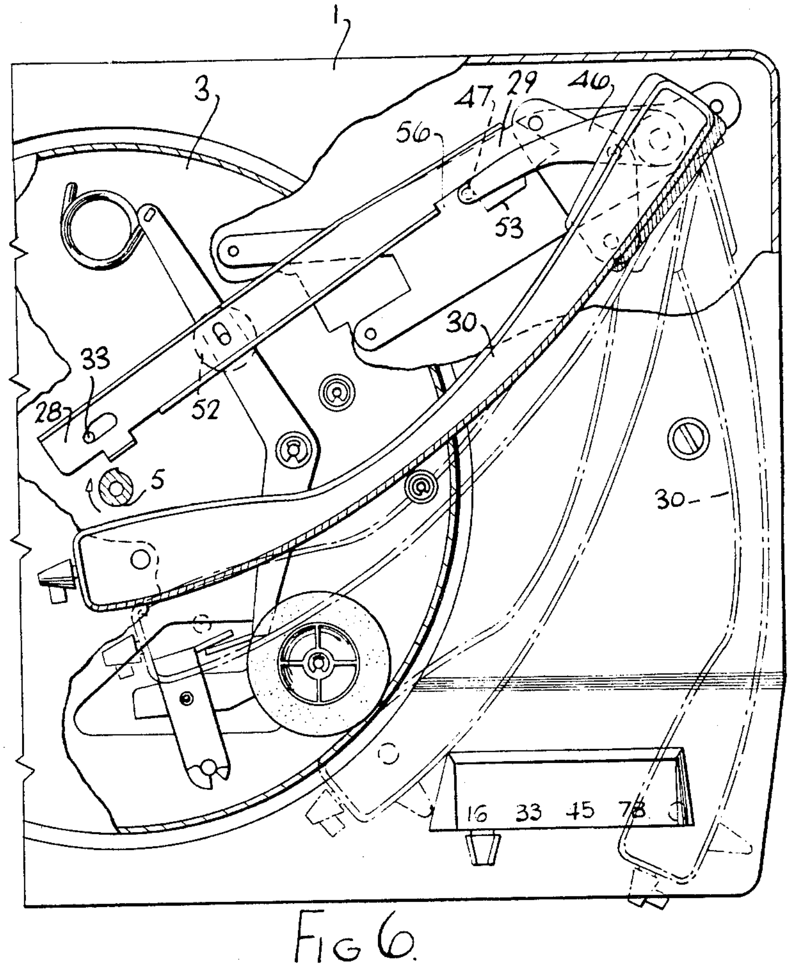
FIGURE 6 shows the same arrangement in the condition of having just been moved to the "off" position.

In accordance with the invention the mechanism includes a switch arm 24 which is also illustrated in FIGURES 2 and 3. This switch arm is an elongated member formed of metal strip and being in general of shallow U-section comprised by a flat base 25 and side walls 26 and 27. The inner end 28 of the switch arm 24 is located above the base 3 of the recess 2 as shown in FIGURES 1, 4 and 6 in the region of the turntable spindle 5 and its outer end 29 is located below the outer part of the table 1 in the region of the axis of pivoting of the pick-up arm 30.

Towards the inner end 28 of the switch arm 24 it is formed with an elongated aperture 32 the longer dimension of which extends longitudinally of the arm. Through this aperture 32 there projects a pin 33 which is fixed to and eccentrically located on the base 3. As shown in FIGURES 1, 4 and 6 the diameter of the pin 33 is less than the minor dimension of the aperture 32. As is indicated in FIGURE 3 the switch arm 24 is formed with an offset portion 34 to allow the arm to extend through an opening 35 in the base 3 to bring the outer end 29 below the table 1. Between its inner end 28 and the offset portion 34 there is formed in the arm a second elongated aperture 36 having its longer dimension transverse to the longitudinal direction of the arm. Into this aperture 36 there extends a pin 37 which is fixed to the arm 20 of the switch lever 18. The diameter of the pin 37 is such that it is an easy sliding fit between the longer sides of the aperture 36 so that any longitudinal movement of the switch arm 24 will be effective to turn the arm 20 about its pivot 19. At the underside of the arm 20 an extension of the pin 37 extends through an elongated slot in the base 3 and there is coupled to it a switch controlling lever which does not appear in the drawings. Towards the inner end 28 of the switch arm 24 its side wall 27 is cut away and approximately mid-way between the termination of the wall 27 and the end of the arm, it is formed with a short lateral extension 38 the boundary edge of which is upturned to form a projection 39. On the turntable spindle 5 there is formed (see FIGURES 7 and 8) a cam 40 which is formed with an operative face 41. The projection 39 and the operative face 41 are so shaped that if the projection is moved into the path of circular movement of the cam 40 the latter will engage the end 54 of the projection 39 and serve to exert a force tending to move the switch arm 24 longitudinally and outwardly, that is generally in a direction towards the pick-up arm pivot 31.

At its outer end 29 the switch arm is formed with a contact surface 42 extending substantially at 45° to the length of the arm. To the underside of the table 1 and its base 3 there is fixed a substantially flat pick-up spindle supporting bracket 43 (FIGURE 4). Towards its outer end this bracket 43 carries the pick-up supporting spindle 31 which extends through an opening in the table 1. On the pick-up itself there is formed a boss 45 which fits over and is freely rotatable on the spindle 31. Integral with this boss there is provided an arm 46 carrying at its outer end a downwardly extending peg 47. Pivotally mounted at 48 on the bracket 43 there is provided a lever 49 on the opposite ends of which are provided pegs 50 and 51 as shown in FIGURE 4. The arrangement is such that when the pick-up arm is turned outwardly one peg 51 on the lever 49 is engaged by the arm 46, this tending to turn the lever 49 counterclockwise. In the position shown in FIGURE 1 the arm 46 is already in engagement with one peg 51, the other peg 50 being out of contact with the guide surface 42 (FIGURE 2) on the outer end of the switch arm 24. Continued turning movement of the pick-up arm will bring the peg 50 into engagement with the surface 42 (FIGURE 4). The effect of this will be to force the switch arm 24 longitudinally and this will cause the arm 20 of the switch lever 18 to be displaced into the "on" position shown in FIGURE 4. If prior to this taking place the pin 37 is at the other end of the slot 36 to that indicated in FIGURE 4 the first effect of the pressure of the peg 50 on the surface 42 will be to tend to cause the switch arm 24 to pivot about the pin 33 at the inner end of the arm, the pin 33 being at that end of the slot 32 which is furthest from the pick-up arm pivot 31. After the switch arm has been moved into the "on" position the inner end 54 of the projection 39 will be in a position to be engaged by the operative face 41 of the cam 40 as hereinafter described.

Between the adjacent surfaces of the arm 20 and the switch arm 24 there is interposed a fibre washer 52. This constitutes a frictional member the purpose of which will be indicated hereinafter.

Figure 5:
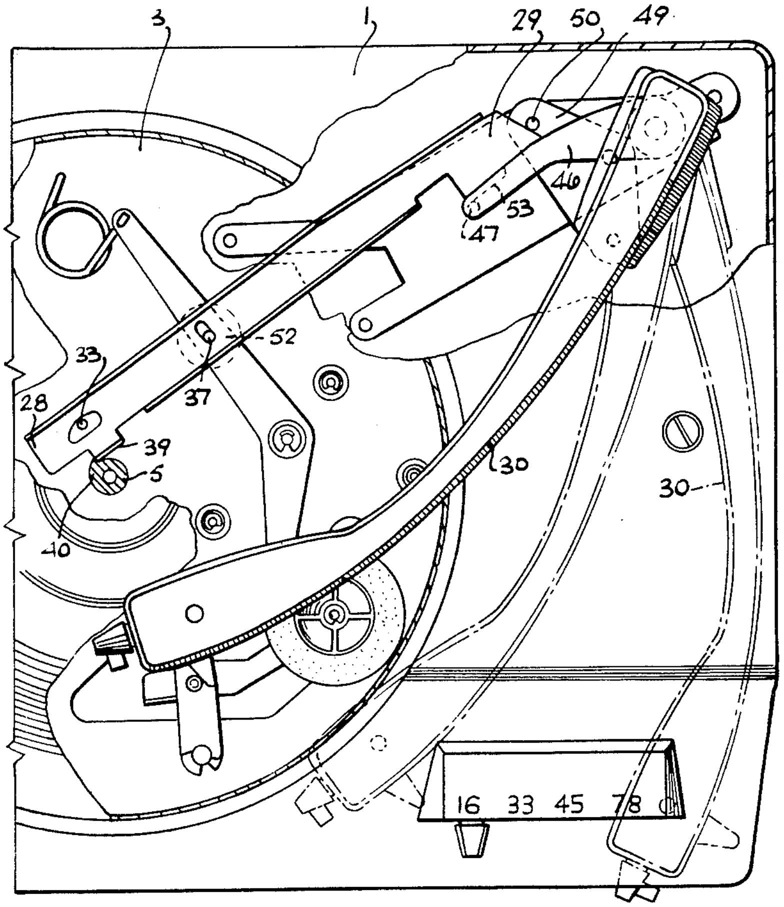
FIGURE 5 shows the arrangement of FIGURE 4 just prior to the mechanism being moved to the "off" position.
Figure 7:
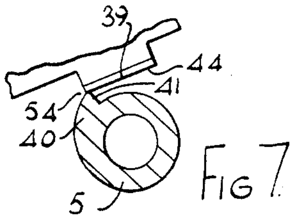
FIGURE 7 is an enlarged view of a detail prior to the arrangement being about to be displaced to the "off" position; and, FIGURE 8 represents the same detail in the condition to effect movement to the "off" position.
Figure 8:
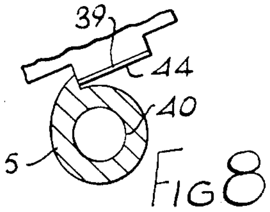

When the pick-up is in engagement with a record disc carrier on the turntable, the pick-up arm 30 will slowly turn inwardly about its pivot 31 and as the pick-up approaches the end of the record track the peg 47 on the arm 46 will come into engagement with a short guide surface 53 formed on the inner end 29 of the switch arm 24 as indicated in FIGURE 5. It will be apparent that the angular movement of the peg 47 takes place very slowly. It will also be apparent that the lever 49 is free to turn so that there will be no resistance by the peg 50 to movement of the inner end 29 of the switch arm. It will be appreciated that in this condition the pin 33 is now located away from the inner end of the elongated slot 32, that is away from the position shown in FIGURE 1. The effect of the friction member 52 is such that as the outer end 29 of the switch arm 24 is very slowly displaced by the pressure of the peg 47 on the face 53 the switch arm will tend to pivot about the pin 37 so that the projection 39 will be moved towards the path of the cam 40. The arrangement is such that under these conditions the cam will engage the outer surface 44 of the projection 39 as indicated in FIGURE 7 and thus continually cause the arm 24 to be turned in the opposite sense, in that it will actually pivot about the point of engagement of the peg 47 and surface 53. At the end of the record track the pick-up arm will be turned inwards at a very much accelerated rate which will cause a sudden increase in the rate of displacement of the outer end of the switch arm. The effect of this will be to move the projection 39 suddenly and further than previously into the path of the cam 40. In consequence thereof the operative face 41 of the cam will engage the end 54 of the projection 39 as indicated in FIGURES 5 and 8 and cause the switch arm 24 to be longitudinally displaced into the "off" position, that is the position shown in FIGURE 6. The effect of this will be to return the complete mechanism to the "off" condition.

It will be seen in FIGURE 2 that there is formed on one boundary of the aperture 32 at the inner end 28 of the switch arm 24 an inclined surface 55 which, as will be apparent from FIGURES 1 and 6, engages the peg 33 so as to turn the inner end 28 of the switch arm 24 in the sense to withdraw the projection 39 completely clear of the path of the cam 40 and also provide a virtual pivotal connection between the arm 24 and the pin 33 in the "off" condition. Adjacent the guide surface 53 at the outer end of the switch arm 24 there is formed a recess 56 to receive the peg 47 to permit the pick-up arm 24 to be turned freely inwardly in this condition of the mechanism.

In FIGURE 3 there is shown attached to the underside of the inner end 29 of the switch arm 24 a nylon projection 57 which provides a sliding support for this end 29 of the arm on the upper surface of the bracket 43.

As the switch arm 24 moves longitudinally from the "on" position its outer end 29 will be initially displaced in the sence to move the guide surface 53 away from its engagement with the peg 47 on the lever 46.

What I claim then is:

1. A record player including a pivotally mounted pick-up arm, a turntable and mechanism for starting and stopping the rotation of said turntable, said mechanism comprising an elongated arm, a pivotally mounted first lever, spring toggle biasing means coupled to said first lever, a frictional pivotal coupling between said first lever and said elongated arm at a position between two ends of said arm, and means in said frictional pivotal coupling to permit limited transverse movement of said elongated arm relative to said first lever, a cam on said turntable and a cam-engaging abutment on one end of said elongated arm for engagement by said cam to displace said elongated arm longitudinally and thereby turn said first lever to a stopping position, a coupling between the base plate of the record player and said one end of said elongated arm to provide for limited longitudinal movement of said elongated arm, and also limited transverse movement of said one end thereof, relatively to said base plate, and a lost motion coupling between said elongated arm and said pick-up arm, said lost motion coupling including means on said pick-up arm for engaging and longitudinally displacing said elongated arm to turn said first lever to a starting position as said pick-up arm is turned away from said turntable, and means for engaging and turning said elongated arm to move said abutment towards said cam as said pick-up arm turns in the opposite sense over said turntable.

2. A record player including a pivotally mounted pick-up arm, a turntable and mechanism for starting and stopping the rotation of said turntable, said mechanism comprising an elongated arm, a pivotally mounted first lever, spring toggle biasing means coupled to said first lever, a first projection, on one of the members comprising said elongated arm and said first lever, extending into and being a sliding fit in an elongated first opening in the other of said members and the longer dimension of said first opening being transverse to the length of said elongated arm, a frictional element interposed between said elongated arm and said first lever to provide with the engagement of said first projection in said first opening a frictional pivotal coupling at a position between two ends of said elongated arm to permit pivotal movement and limited transverse movement of said elongated arm relatively to said first lever, a cam formation on said turntable and a cam-engaging abutment on one end of said elongated arm, for engagement by said cam to displace said elongated arm longitudinally and thereby turn said first lever to a stopping position, a coupling between the base plate of the record player and said one end of said elongated arm to provide for limited longitudinal movement of said elongated arm, and also limited transverse movement of said one end thereof relatively to said base plate, and a lost motion coupling between said elongated arm and said pick-up arm, said lost motion coupling including means on said pick-up arm for engaging and longitudinally displacing said elongated arm to turn said first lever to a starting position as said pick-up arm is turned away from said turntable, and means for engaging and turning said elongated arm to move said abutment towards said cam as said pick-up arm turns in the opposite sense over said turntable.

3. A record player including a pivotally mounted pick-up arm, a turntable and mechanism for starting and stopping the rotation of said turntable, said mechanism comprising an elongated arm, a pivotally mounted first lever, a spring toggle biasing means coupled to said first lever, a frictional pivotal coupling between said first lever and said elongated arm at a position between two ends of said arm, and means in said frictional pivotal coupling to permit limited transverse movement of said elongated arm relatively to said first lever, a cam on said turntable and a cam-engaging abutment on one end of said elongated arm for engagement by said cam to displace said elongated arm longitudinally and thereby turn said first lever to a stopping position, a second projection on one of the members comprising the base of said player and said one end of said elongated member, said second projection extending into an elongated second opening in the other of said members, the longer dimension of said second opening being in the direction of the length of said elongated arm and said second projection being smaller than the smaller dimension of said second opening, said second projection and said second opening together constituting a coupling between said base and said one end of said elongated arm to provide for limited longitudinal movement of said elongated arm, and also limited transverse movement of said one end thereof, relatively to said base plate, and a lost motion coupling between said elongated arm and said pick-up arm, said lost motion coupling including means on said pick-up arm for engaging and longitudinally displacing said elongated arm to turn said first lever to a starting position as said pick-up arm is turned away from said turntable, and means for engaging and turning said elongated arm to move said abutment towards said cam as said pick-up arm turns in the opposite sense over said turntable.

4. A record player as claimed in claim 3, in which the said second opening is formed with a boundary edge for engagement with said second projection, and said boundary edge is inclined to the major axis of said elongated arm in the sense to cause said one end of said elongated arm to be positively moved away from the axis of said turntable by the engagement of said second projection with said boundary edge on said elogated arm is displaced by said cam in engagement with said cam-engaging abutment.

5. A record player including a pivotally mounted pick-arm arm, a turntable and mechanism for starting and stopping the rotation of said turntable, said mechanism comprising an elongated arm, a pivotally mounted first lever spring toggle biasing means coupled to said first lever, a frictional pivotal coupling between said first lever and said elongated arm at a position between two ends of said arm, and means in said frictional pivotal coupling to permit limited transverse movement of said elongated arm relative to said first lever, a cam on said turntable and a cam-engaging abutment on one end of said elongated arm for engagement by said cam to displace said elongated arm longitudinally and thereby turn said first lever to a stopping position, a coupling between the base plate of the record player and said one end of said elongated arm to provide for limited longitudinal movement of said elongated arm, and also limited transverse movement of said one end thereof, relatively to said base plate, the end of said elongated arm which is furtherest from said cam-engaging abutment being provided with a first contact surface inclined to the length of said elongated arm and there being provided, between said first contact surface and said pick-up arm, a pivotally mounted double-arm lever of which one arm is engageable by said pick-up arm, during turning movement of said pick-up arm away from the axis of said turntable, to bring the other arm of said double-arm lever into operative engagement with said first contact surface to impart in succession transverse movement and longitudinal displacement to said elongated arm, and the last mentioned end of said elogated arm being provided with a second contact surface engageable by said pick-up arm, during turning movement of said pick-up arm towards said axis, to turn said elongated arm about its pivotal coupling with said first lever to move said abutment towards said axis.

References Cited by the Examiner

FOREIGN PATENTS

| | | |
|---|---|---|
| 146,817 | 1/1948 | Australia. |
| 966,946 | 9/1957 | Germany. |
| 419,205 | 11/1934 | Great Britain. |

NORTON ANSHER, *Primary Examiner.*